No. 749,854. PATENTED JAN. 19, 1904.
W. H. FAHRNEY.
MEANS FOR CONVERTING FAINT VIBRATIONS INTO ELECTRICAL ENERGY.
APPLICATION FILED JAN. 10, 1903.
NO MODEL.
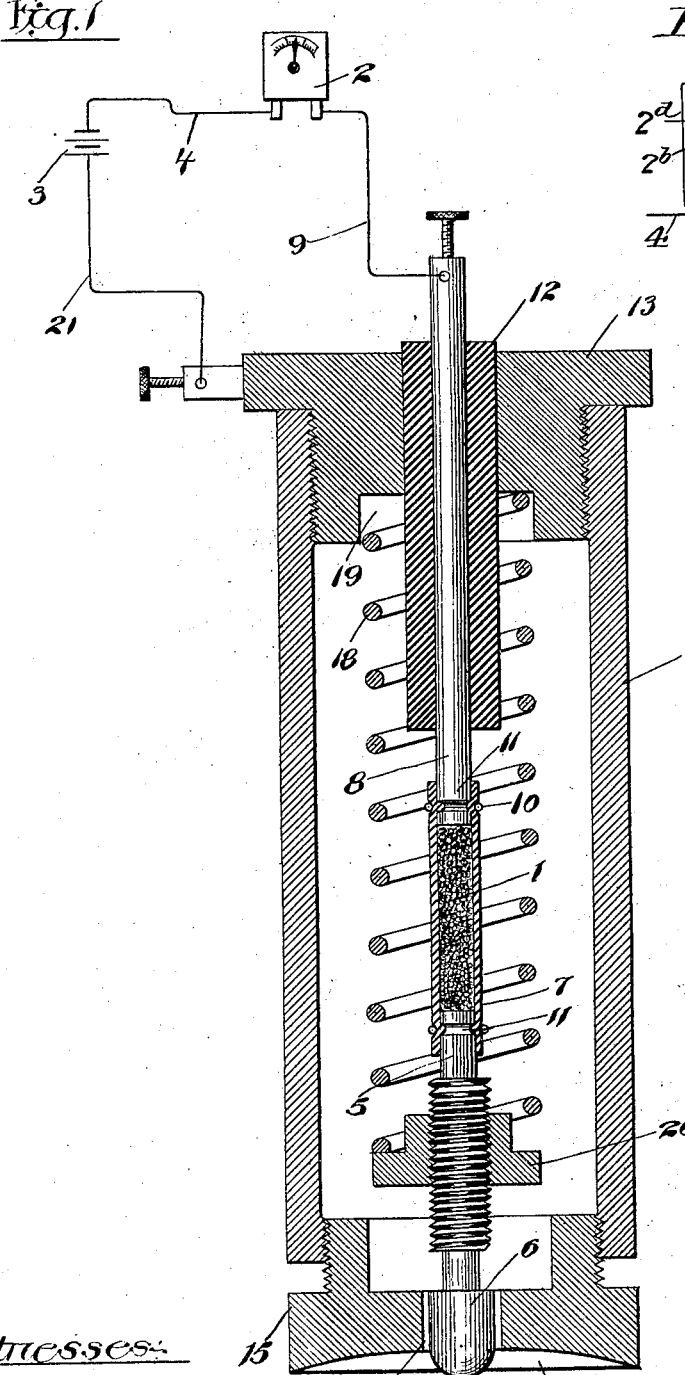
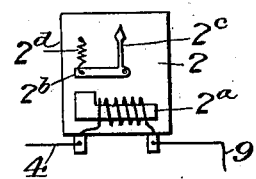
Witnesses: Inventor:

No. 749,854. Patented January 19, 1904.

UNITED STATES PATENT OFFICE.

WILLIAM HENRY FAHRNEY, OF CHICAGO, ILLINOIS.

MEANS FOR CONVERTING FAINT VIBRATIONS INTO ELECTRICAL ENERGY.

SPECIFICATION forming part of Letters Patent No. 749,854, dated January 19, 1904.

Application filed January 10, 1903. Serial No. 138,464. (No model.)

*To all whom it may concern:*

Be it known that I, WILLIAM HENRY FAHRNEY, a citizen of the United States, residing at Chicago, in the county of Cook and State of Illinois, have invented certain new and useful Improvements in Means for Converting Faint Vibrations into Electrical Energy, of which the following is a full, clear, and exact specification.

My invention relates to means for converting vibrations, especially faint vibrations, into electrical energy for variations in the strength of an electric current, such vibrations being, for example, the heart's pulsation, whereby such vibration may be indicated; and the invention has for its primary object to provide a simple and improved form of device for such purpose or purposes especially adapted for indicating such pulsation or action by variations or undulations in an electric circuit.

With these ends in view my invention consists in certain features of novelty in the construction, combination, and arrangement of parts by which the said object and certain other objects hereinafter appearing are attained, all as fully described with reference to the accompanying drawings and more particularly pointed out in the claims.

In the said drawings, Figure 1 is a longitudinal sectional view of my improved apparatus illustrated in connection with an electric circuit and indicator, which are shown diagrammatically. Fig. 2 is a diagrammatic view of an indicator.

1 represents a quantity of small particles of electric conducting material—such, for example, as pulverized or comminuted plumbago, powered carbon, &c.—which is interposed in one side of the circuit which connects one pole of any suitable indicator or recorder 2 with one pole of a battery 3 or other suitable source of electricity, the opposite pole of said battery being connected by conductor 4 or other suitable means with the other pole of the recorder or indicator 2, so that the circuit from the battery through the indicator must traverse the particles 1, and the strength of the circuit may therefore be varied, and such variation or undulation correspondingly recorded or indicated on the indicator 2 by the compression or expansion of the mass of particles 1. As a simple and efficient means of producing this expansion or contraction of the mass 1 by the heart's pulsations or other like action I employ a plunger 5, which is provided on one end with any suitable knob 6, adapted to be pressed against the pulse for receiving the motion thereof, while to its other end is secured one end of a compressible tube 7, preferably composed of india-rubber, containing the mass of particles 1, which rest upon the upper end of plunger 5 or are otherwise given electrical communication therewith, and also bear permanently in contact with the lower end of a stem or support 8, which is connected in any suitable way, as by conductor 9, with one pole of the indicator or recorder 2, and is also secured to the upper end of the compressible tube 7. The connection between the tube 7 and said plunger 5 and stem 8 is shown as effected by a suitable wrapping of cord 10 passed around the members 5 8 where the latter are grooved, as shown at 11. The stem 8 is secured in a sleeve 12 of fiber or other suitable non-conductor, which in turn is secured in a head 13, forming one end of a casing whose body portion is constituted by a tube or cylinder 14, secured or otherwise screwed to head 13 at one end and at its other end to an adjustable plug 15, which is provided with an aperture 16 for the passage of the knob 6. The under side of this plug 15 is preferably cup-shaped, as shown at 17, so as to better enable it to support the device upon the wrist over the pulse without causing undue pressure against the knob 6, the pressure of which latter against the pulse may be regulated by adjusting the plug 15, which therefore serves as a gage for said shoe.

The knob 6 is pressed toward the pulse by any suitable cushion, such as a coil-spring 18, whose upper end is confined in a recess 19 in the head 15, while its lower end bears upon a flanged nut or support 20, threaded on the plunger 5, so as to be capable of adjustment, and thereby varying the tension of the spring, which also establishes electrical communication between the head 13 and the plunger 5, the head 13 being connected by conductor 21 to the battery 3, and thus insures a perfect circuit should the knob 6 be too loose or fail at any time to establish electrical communication between the plunger 5 and the casing 14, which, with the construction shown, might be composed of either metal or a non-conducting material.

The indicator 2 may be any of the well-known devices already employed in this art or employed for the purpose of indicating variations in the strength of electric circuits or any other suitable device that will either record or indicate the undulations produced in the circuit by the varying compression of the particles 1. As a mere example of such a device I have shown in Fig. 2 an electromagnet $2^a$, connected to wires 4 9, and an armature $2^b$, connected to the index $2^c$ of the indicator and to a spring $2^d$, which pulls it away from the magnet when the latter is deenergized.

I have not claimed, broadly, the variable resistance or variable conductor constituted by the elements 1, 7, 5, and 8, as the same forms the subject-matter of the claims in a copending application.

Having thus described my invention, what I claim as new therein, and desire to secure by Letters Patent, is—

1. In a device for the purpose described the combination of a plunger, an adjustable gage or support through which said plunger passes, a variable resistance operatively related to said plunger, an electric circuit including said resistance and means included in said circuit for indicating undulations in the strength thereof, substantially as set forth.

2. In a device for the purpose described the combination of a plunger, a nut adjustably secured thereon, a casing inclosing said nut and plunger, a spring bearing between one end of said casing and said nut, a support in said casing insulated therefrom, a compressible tube attached at one end to said support and at its other end to said plunger, a mass of conducting particles in said tube, an electric circuit including said mass of particles and means in said circuit for indicating undulations in the strength thereof, substantially as set forth.

WILLIAM HENRY FAHRNEY.

Witnesses:
F. A. HOPKINS,
M. B. ALLSTADT.